United States Patent [19]
Stanfield

[11] Patent Number: 4,770,524
[45] Date of Patent: Sep. 13, 1988

[54] SLIDE PROJECTION SYSTEM FOR COPLANAR STORED SLIDES

[76] Inventor: James S. Stanfield, P.O. Box 1983, Santa Monica, Calif. 90403

[21] Appl. No.: 5,912

[22] Filed: Jan. 21, 1987

[51] Int. Cl.⁴ .............................................. G03B 21/10
[52] U.S. Cl. ................... 353/108; 353/27 R; 353/120
[58] Field of Search ................. 353/120, 25, 27 R, 43, 353/108, 22, 21, 95, 96

[56] References Cited

U.S. PATENT DOCUMENTS

| | | | |
|---|---|---|---|
| 2,260,551 | 10/1941 | Boni et al. | 353/77 X |
| 2,271,530 | 2/1942 | Wick . | |
| 2,515,602 | 7/1950 | Jablon | 353/108 |
| 2,534,561 | 12/1950 | Silver | 353/108 |
| 2,583,510 | 1/1952 | Ingram | 353/43 X |
| 3,466,126 | 9/1969 | Sakamoto . | |
| 3,712,725 | 1/1973 | Eckerdt | 353/68 |
| 3,973,344 | 8/1976 | Frankel . | |
| 4,133,605 | 1/1979 | Wiggin . | |
| 4,184,754 | 1/1980 | Ozeki . | |

FOREIGN PATENT DOCUMENTS

| | | | |
|---|---|---|---|
| 509825 | 11/1974 | Fed. Rep. of Germany . | |
| 1231770 | 4/1960 | France | 353/27 R |
| 0115918 | 6/1985 | Japan | 353/25 |

*Primary Examiner*—Harry N. Haroian
*Attorney, Agent, or Firm*—Freilich, Hornbaker, Rosen & Fernandez

[57] ABSTRACT

Apparatus is described for use with a projector which can direct light substantially horizontally through a projection location and which can project the image of a slide thereat onto a screen, which enables the projection of the images of slides contained in a flexible storage sleeve of a type which is normally stored in a three-ring binder with the slides coplanar. A carrier has a pair of slightly spaced walls for receiving the storage sleeve between them, the walls having rows and columns of transparent regions corresponding to the location of the slides in the sleeve. A holder slidably supports the carrier so one of its slides lies at the projection location for projecting the image onto a screen. The holder allows the carrier to be slid horizontally to show any of the slides in a row of slides on the sleeve, and allows the carrier to be moved vertically to show the slides on another row of the sleeve.

16 Claims, 6 Drawing Sheets

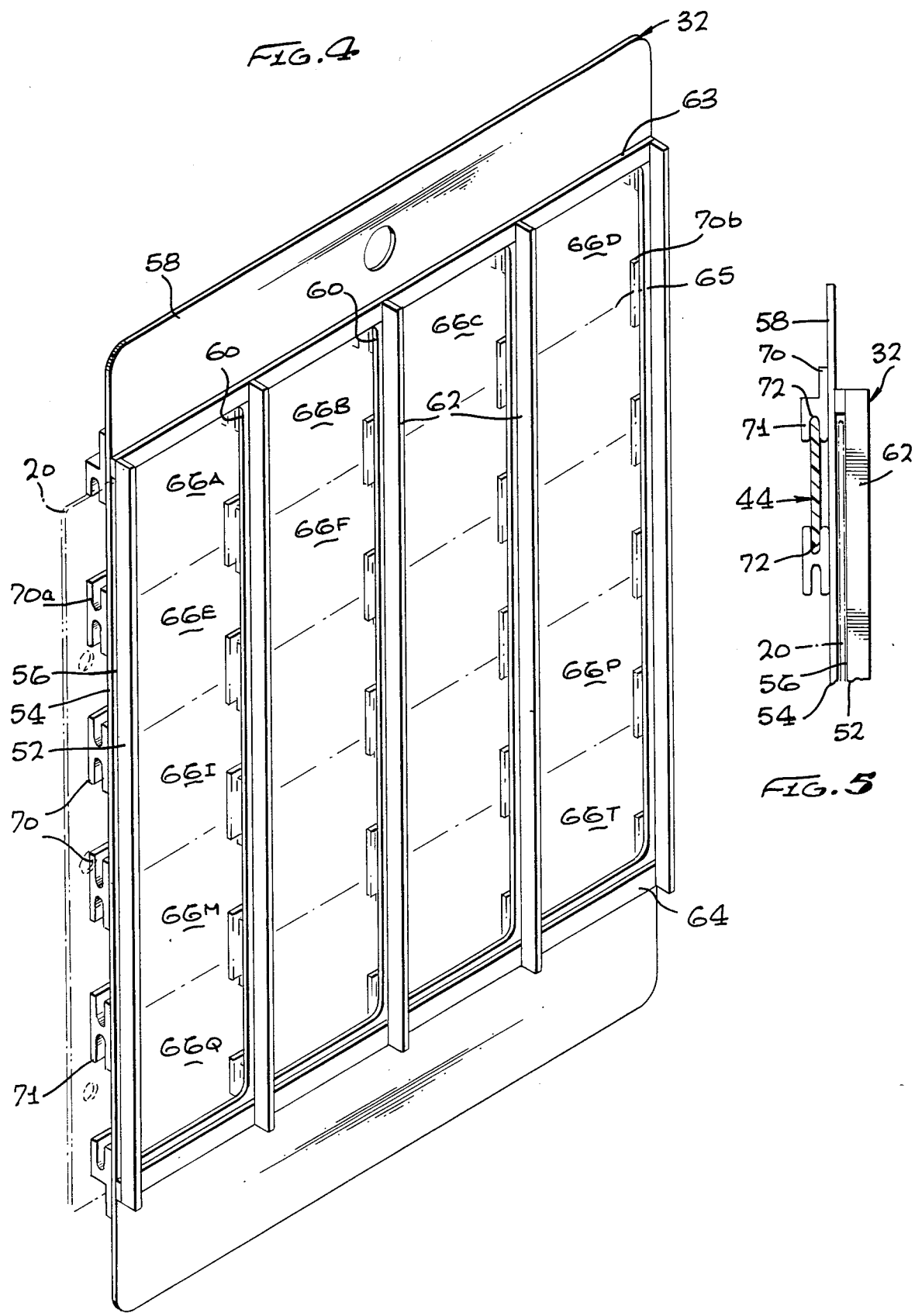

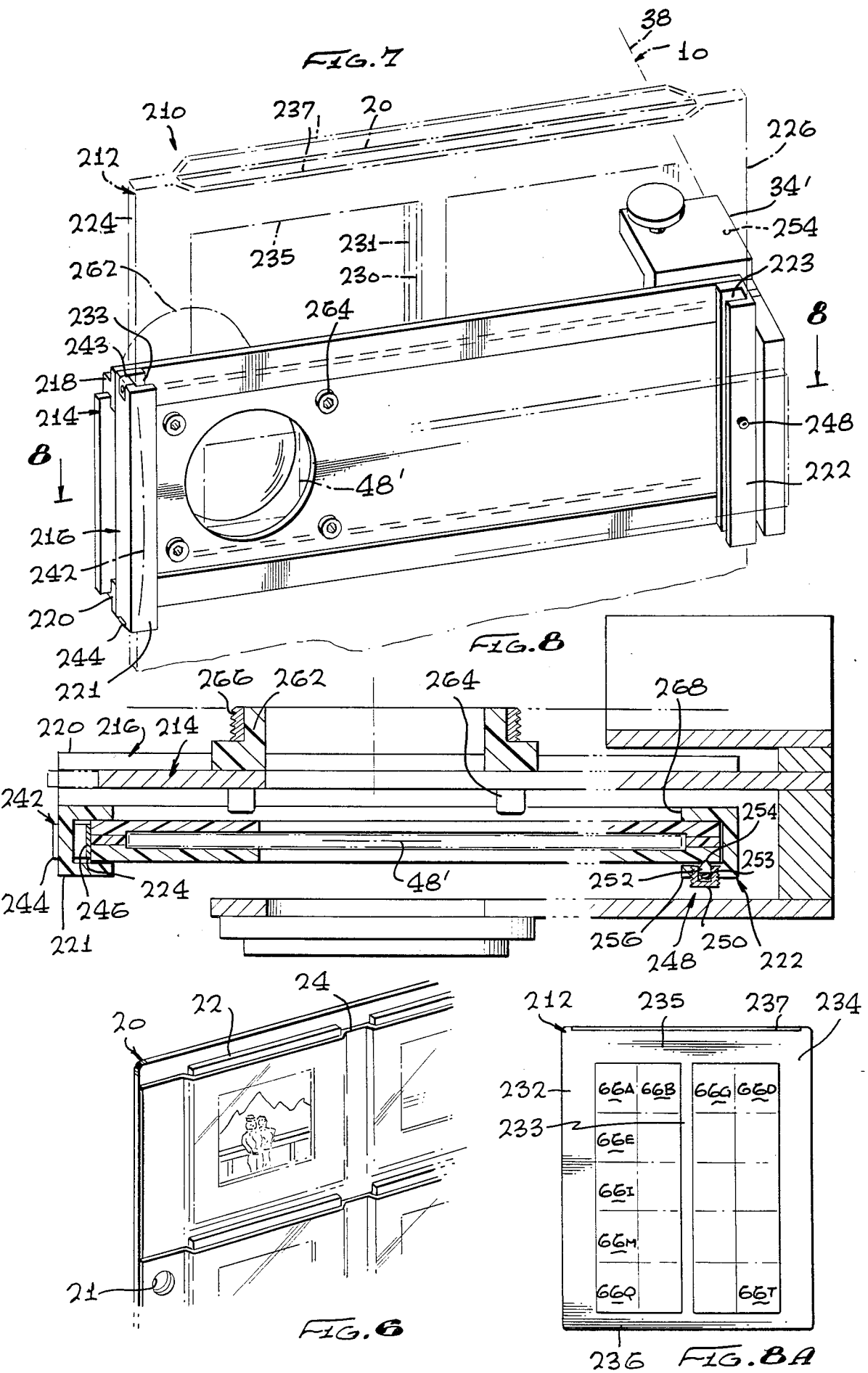

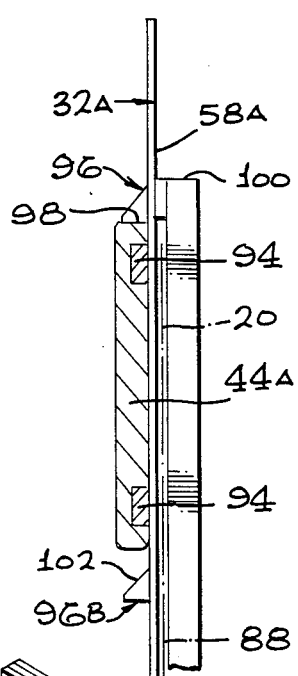
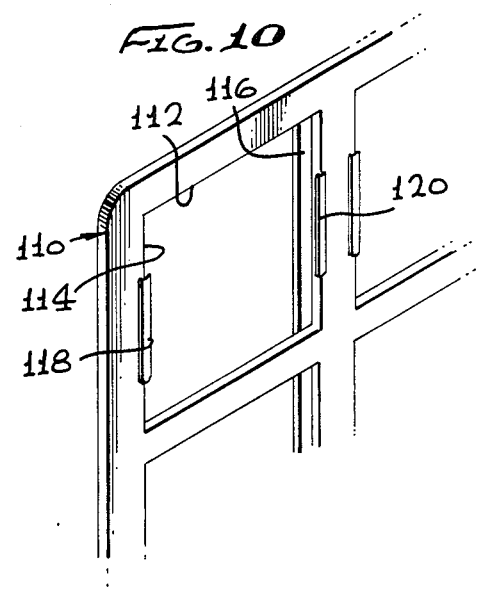
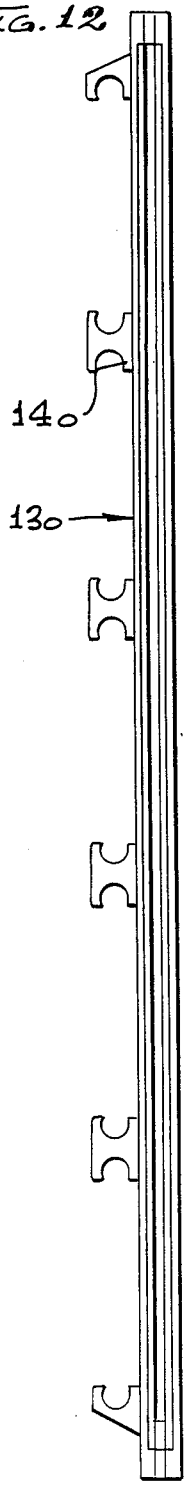
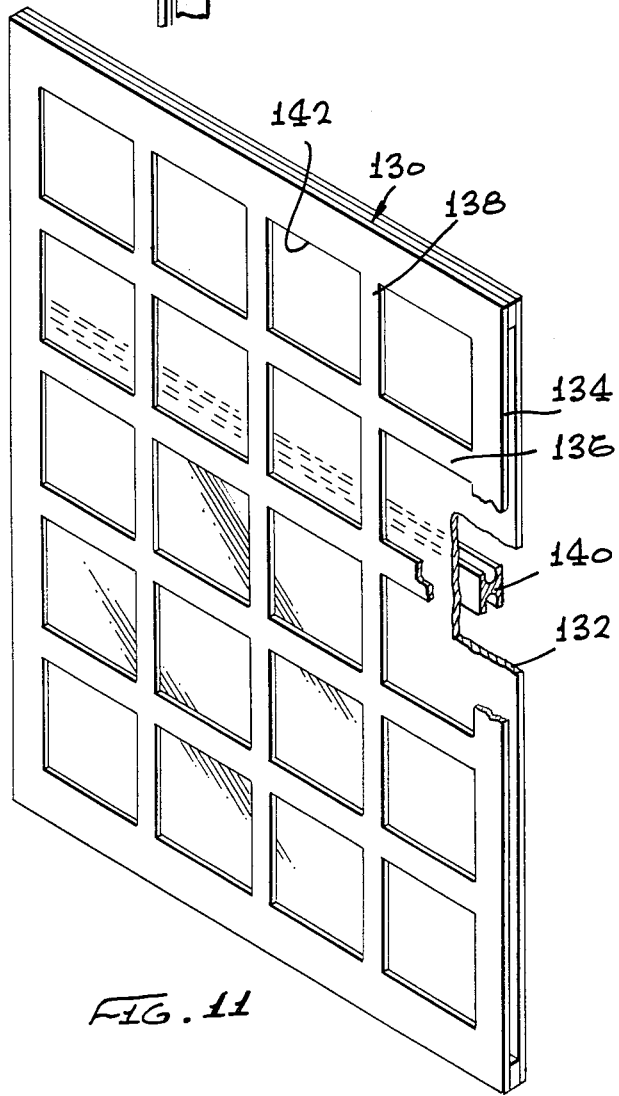
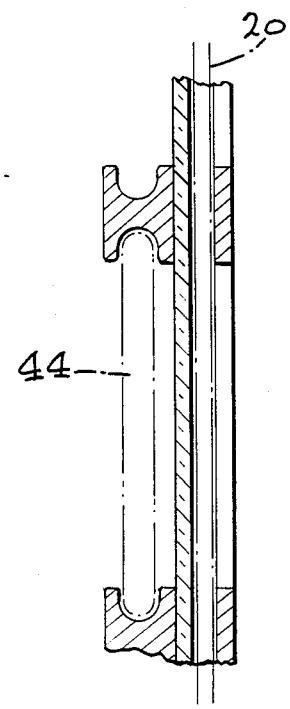

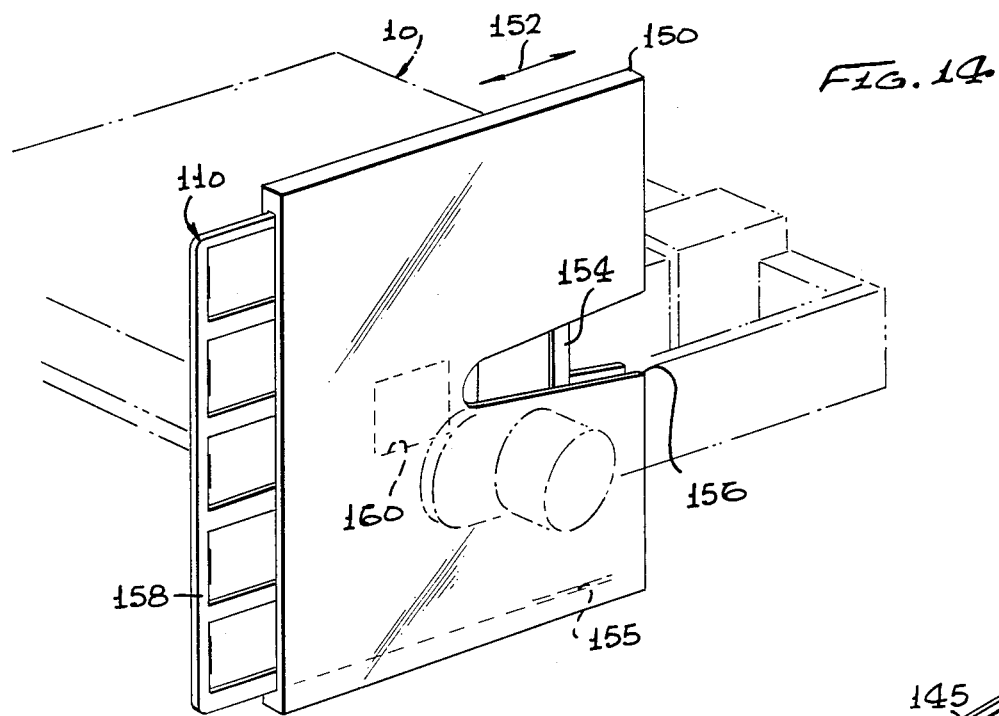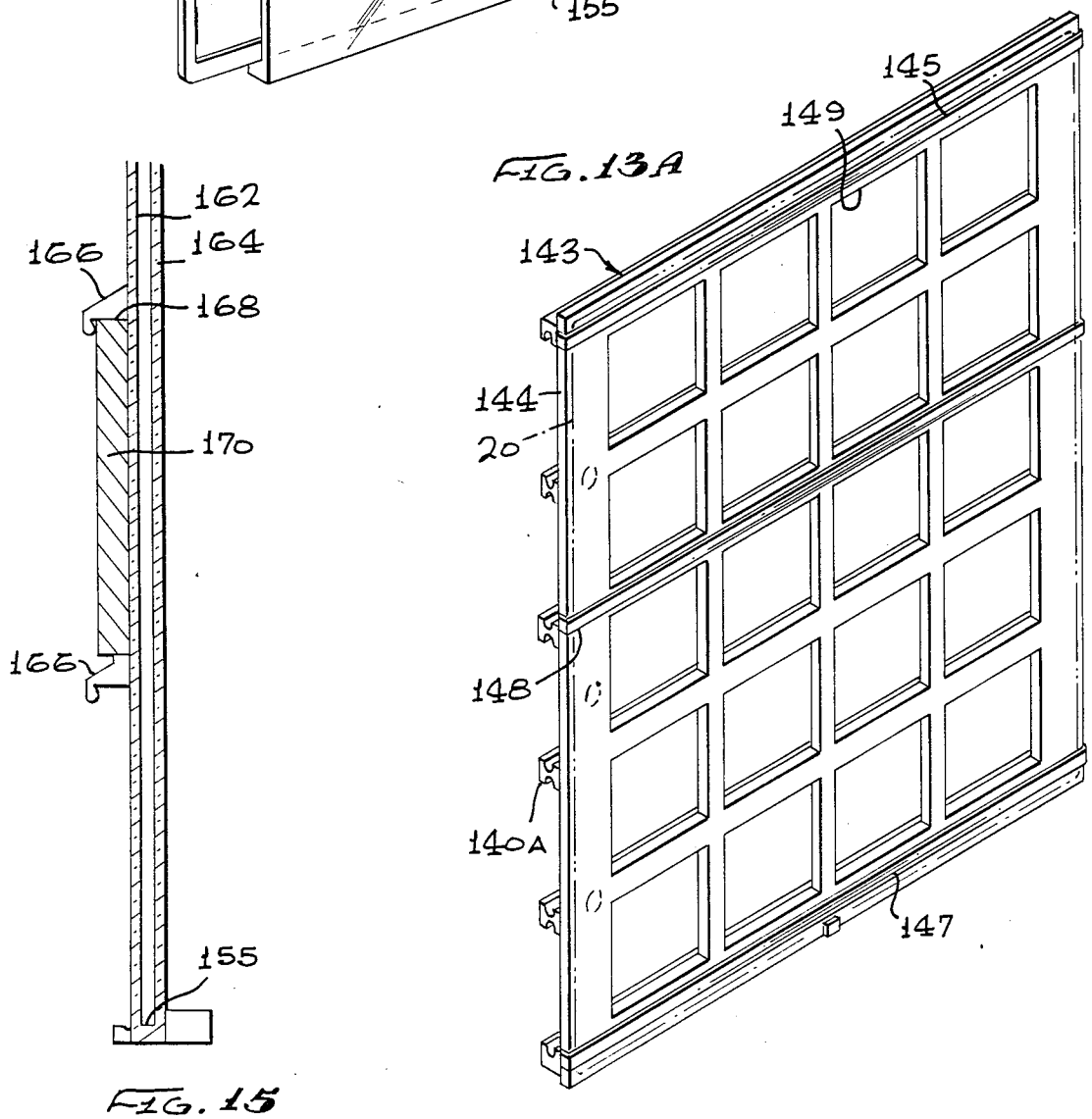

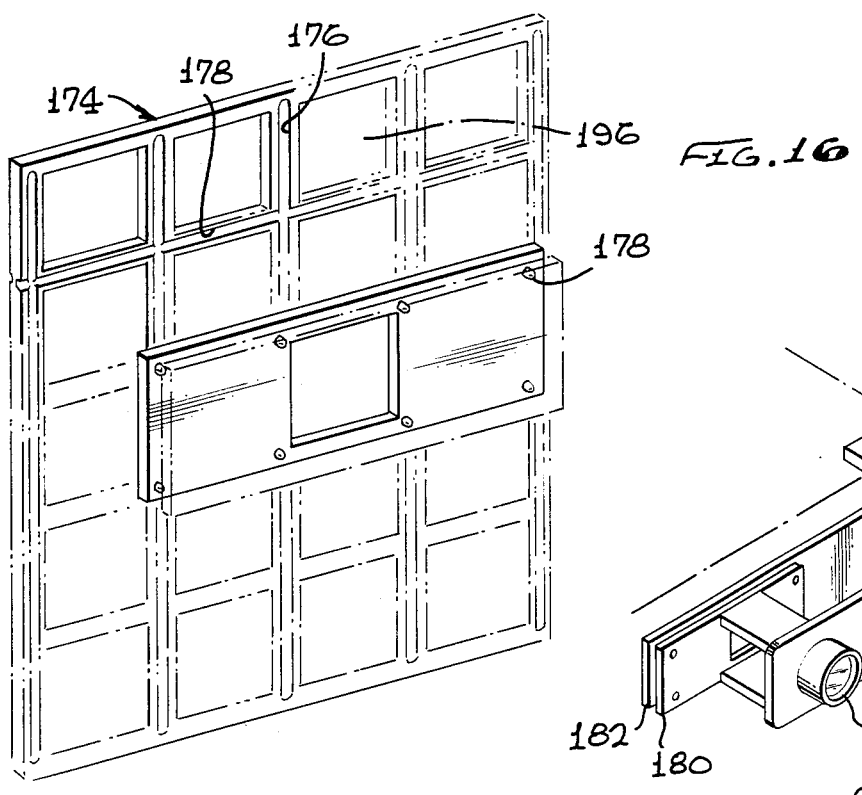
FIG. 16
FIG. 17
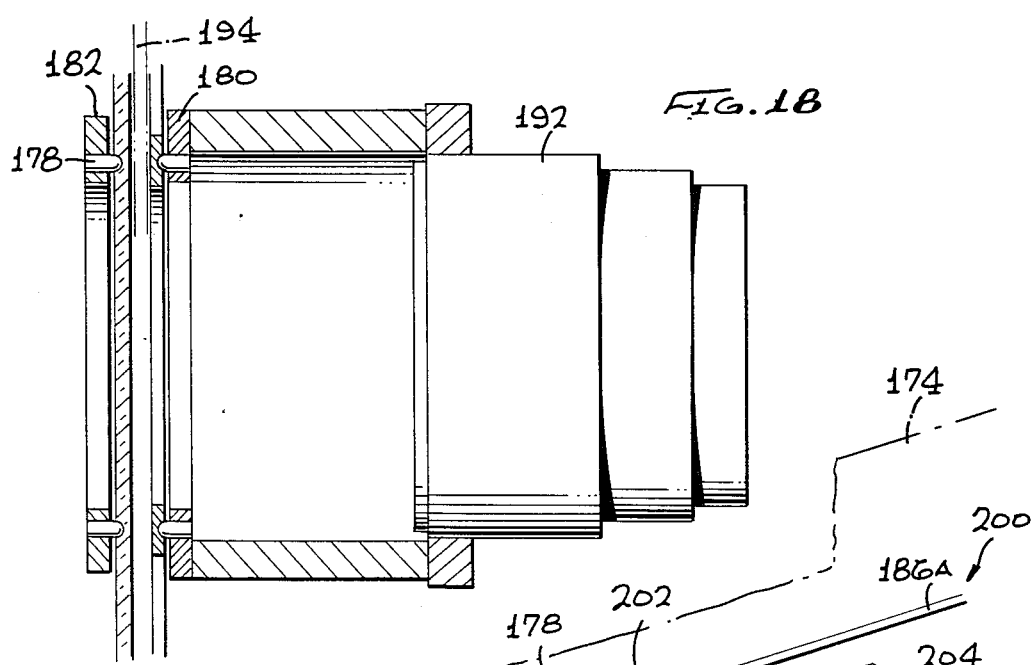
FIG. 18
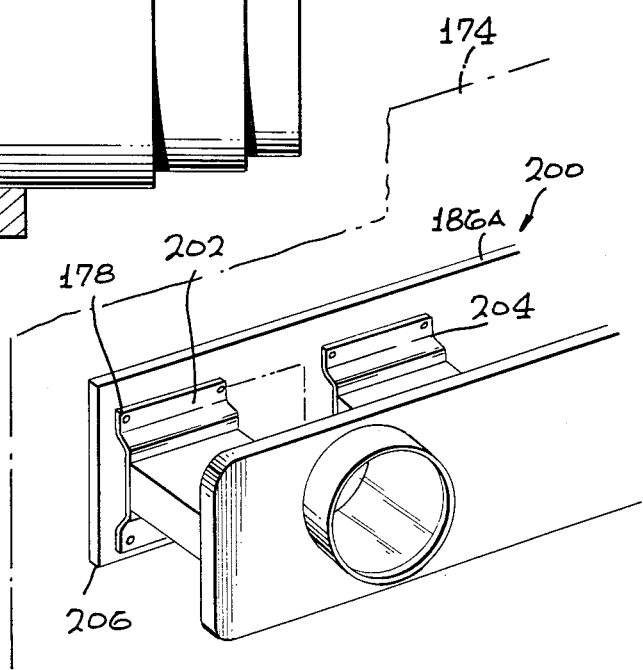
FIG. 19

4,770,524

SLIDE PROJECTION SYSTEM FOR COPLANAR STORED SLIDES

BACKGROUND OF THE INVENTION

A typical home projector can hold a group of slides in a straight stack or a curved stack known as a carousel, and can move out one slide at a time to a film plane from which the slide image can be projected onto a screen. While the arrangement of slides in a stack facilitates their projection, a person cannot glance rapidly at all of the slides to pick out one. One popular way for storing slides is in a flexible storage sleeve which is transparent and has multiple rows and columns of pockets which can each receive a slide. The slides lie in multiple rows and columns in a common plane, so a person can hold up the sleeve to light and rapidly view any of perhaps 20 different slides. The sleeve may have three holes along one edge for storage in a three ring binder of a type that stores notebook paper (e.g., 8.5 inches by 11 inches). In the past, the projection of the slides onto a screen has necessitated the removal of the individual slides and placing them in a stack. A projection apparatus which allowed the projection of individual slides while they remained in the sleeve, thus eliminating the need for removal of slides from the sleeve and replacement therein, would facilitate both the storage and projection of slides.

SUMMARY OF THE INVENTION

In accordance with one embodiment of the present invention, apparatus is provided which enables the projection onto a screen, of the images of slides contained in a storage sleeve which can hold slides coplanar and in multiple rows and columns. The apparatus includes a carrier which has a support wall and means for maintaining the storage sleeve facewise against the support wall. The carrier allows light to pass through multiple transparent slide-viewing regions where the slides of the storage sleeve lie. The carrier is used with a projection apparatus which directs light at a projection location and which focuses an image of film at that location onto a screen. A holder holds the carrier so that its transparent regions can be sequentially moved into the projection location to project the images of slides lying thereat.

The projection apparatus can include an adapter which fits on a prior art projector of the type that requires slides in a stacked formation. The adapter holds a projection lens forward of the location where the projection lens of the prior projector has normally been located, to provide a gap between them where the carrier can be held.

A projector housing which is of low height and which directs light primarily horizontally can be used with a carrier and storage sleeve of larger height. The projector can lie near the front edge of a support surface, while the carrier and sleeve lie beyond the edge of the table.

The novel features of the invention are set forth with particularity in the appended claims. The invention will be best understood from the following description when read in conjunction with the accompanying drawings.

BRIEF DESCRIPTION OF THE DRAWINGS

FIG. 4 is a perspective view of a carrier of the apparatus of FIG. 1.

FIG. 5 is a view taken on the line 5—5 of FIG. 2.

FIG. 6 is a partial perspective view of a storage sleeve of the prior art, which is used with the apparatus of the present invention.

FIG. 7 is a perspective view of a projection apparatus constructed in accordance with another embodiment of the invention.

FIG. 8 is a view taken on the line 8—8 of FIG. 7.

FIG. 8A is a front elevation view of a carrier of FIG. 7.

FIG. 9 is a partial sectional view of a carrier and holder constructed in accordance with another embodiment of the invention.

FIG. 10 is a partial perspective view of a slide-holding sleeve that can be used with the apparatus of FIG. 1.

FIG. 11 is a perspective view of a carrier of another embodiment of the invention, which can be used with the apparatus of FIG. 1.

FIG. 12 is a side elevation view of the carrier of FIG. 11.

FIG. 13 is a partial sectional view of the carrier of FIG. 11.

FIG. 13A is a perspective view of a carrier of another embodiment of the invention, which can be used with the apparatus of FIG. 1.

FIG. 14 is a perspective of a projection apparatus constructed in accordance with another embodiment of the invention.

FIG. 15 is a partial sectional side view of the apparatus of FIG. 14.

FIG. 16 is a partial perspective view of a projection apparatus constructed in accordance with another embodiment of the invention.

FIG. 17 is a more complete perspective view of the apparatus of FIG. 16, but without the carrier thereof.

FIG. 18 is a partial sectional view of the apparatus of FIG. 17 with the carrier in place.

FIG. 19 is a partial perspective view of a projection apparatus construced in accordance with another embodiment of the invention.

DESCRIPTION OF THE PREFERRED EMBODIMENTS

Figure 1:
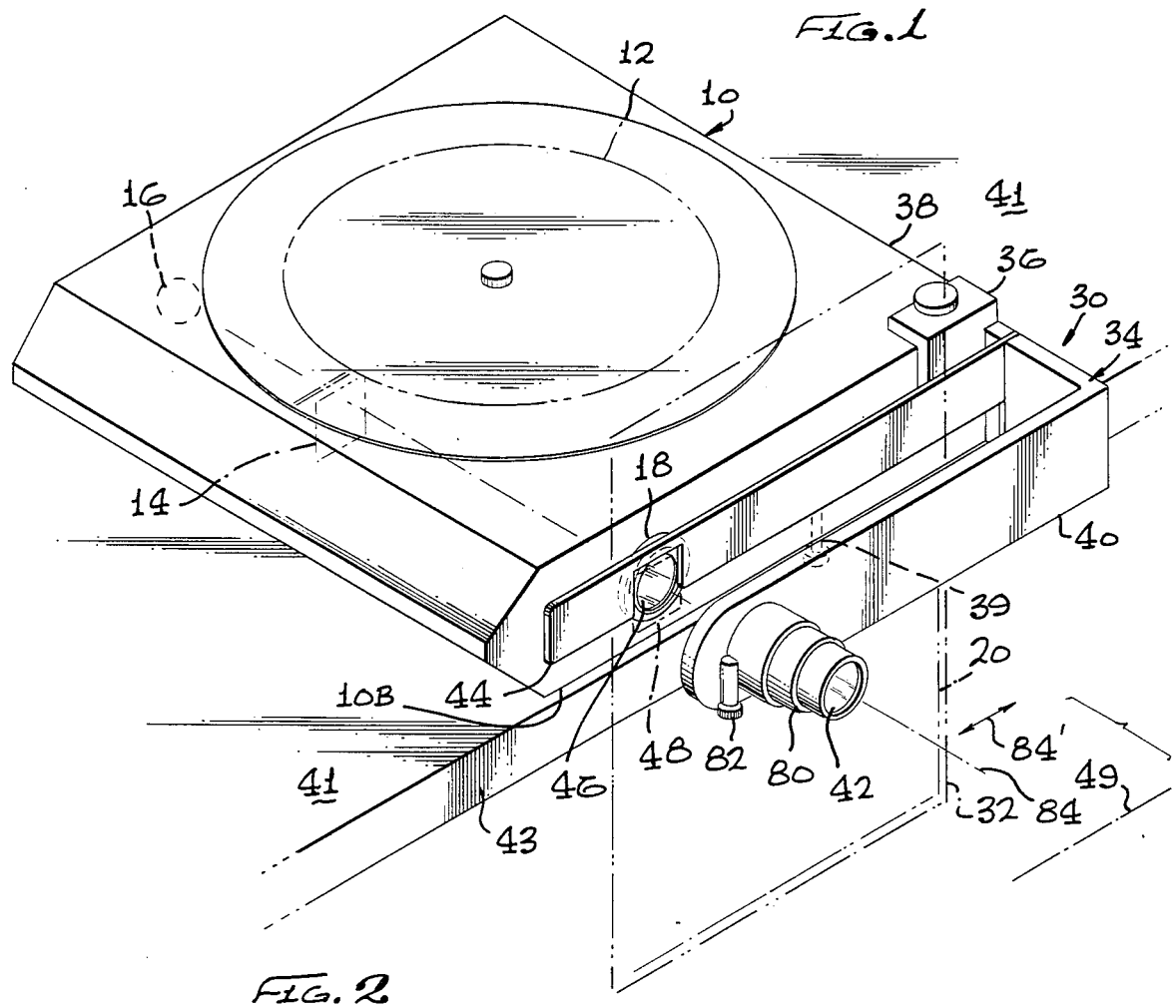
FIG. 1 is a perspective view of projection apparatus, with the carrier and storage sleeve shown in phantom lines.
Figure 2:
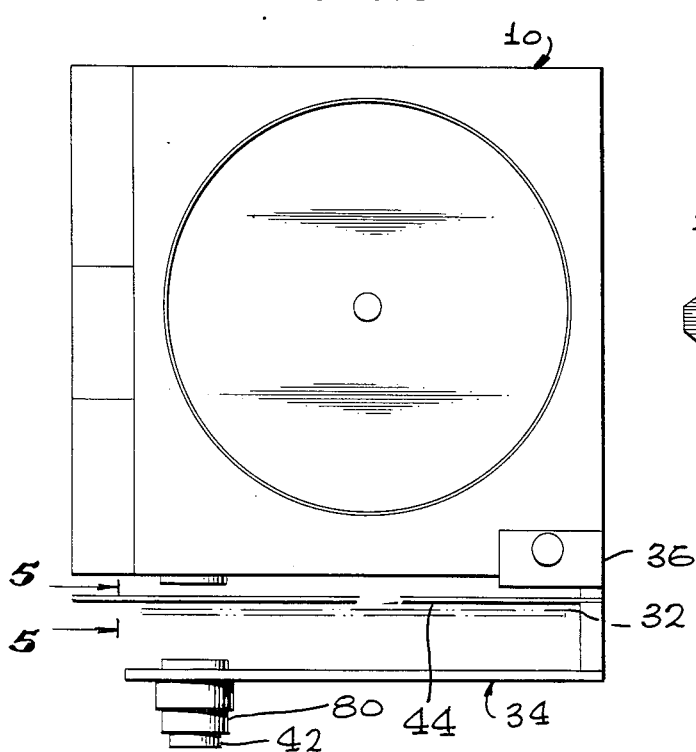
FIG. 2 is a plan view of the apparatus of FIG. 1.
Figure 3:
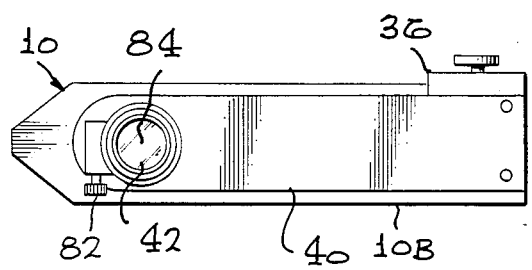
FIG. 3 is a front elevation view of the apparatus of FIG. 2.

FIG. 1 illustrates a prior art slide projector 10 of a carousel type, which holds multiple slides in a curved stack that extends along a circle 12. In such a slide projector, individual slides are ejected sidewardly from the stack into a slide showing position 14 lying in a slide showing plane. Light from a source 16 passes forwardly through a slide at the position 14 and can pass through a lens located at a lens retainer 18 for projection onto a screen. The slide projector 10 by itself has the disadvantage that the slides in the stack at 12 cannot be readily reviewed without projecting them onto a screen.

FIG. 6 illustrates a portion of a flexible slide storage device or sleeve 20 which can hold a group of slides 22 for easy storage and rapid viewing. The sleeve has multiple pockets or slide storage positions 24 arranged in multiple rows and columns, the particular sleeve 20 for which the system is designed having four horizontally-spaced columns and five vertically spaced rows of pockets, so that the sleeve can hold twenty slides. All of the slides 22 in a sleeve are substantially coplanar, and the sleeve has three holes 21 so that the sleeve 20 and other similar sleeves can all be held in a common three ring binder. A single sleeve 20 can be removed and held up to the light, so that a person can quickly see the gross details on any of the twenty slides, which can be useful to determine which of the slides is to be viewed in a slide viewer or projector. While this storage device enables convenient initial viewing, the projection of the slides onto a screen has heretofore required the removal of the slides from the pockets for loading into a cartridge of a projector, and the later removal of the slides and insertion into the pockets of the sleeve.

In accordance with one aspect of the present invention, an adaptor 30 (FIG. 1) is provided which can be mounted on the slide projector 10, to enable the viewing of the slides in a storage sleeve of the type shown in FIG. 6, without the necessity for removing the slides from the pockets of the storage sleeve. The adapter 30 includes a carrier 32 which can hold the storage sleeve 20 so that all of the slides lie substantially coplanar, and which can be moved to project any one of the slides onto a screen. The adapter includes a holder assembly 34 which has a clamp 36 for clamping to the housing 38 of the slide projector. The holder assembly 34 of the adapter also includes a lens holder 40 which can hold a projection lens 42, and further includes a carrier holder 44 which can hold the carrier 32.

An auxiliary lens 46 replaces the original projection lens in the retainer 18. The auxiliary lens 46 concentrates light onto a projection location 48 which lies on a projection plane which contains the carrier 32 and the slide storage sleeve therein. The original projection lens 42 of the slide is used as the projection lens or lens device 42 that is mounted in the lens holder 40 and which forms an image of film at projection location 48 onto a screen 49. Thus, much of the original slide projector 10 is used, including the housing 38 with adjustable legs 39 for positioning all other parts. The light moves primarily horizontally along primarily horizontal axis 84 which is normal to the film plane that includes the projection location 48.

FIGS. 4 and 5 illustrate details of the carrier 32 which carries the flexible slide storage sleeve 20. The carrier 32 has a pair of closely spaced walls 52, 54 forming a narrow space 56 between them into which the slide storage sleeve 20 can fit. The sleeve is shown in a fully loaded or mounted position wherein its slides are positioned at transparent regions such as 66A and 66B. The walls of the particular carrier 32 include an inner or support wall 54 formed by a plate 58 of a material such as aluminum, which has four wide vertical slots 60. The other wall 52 mounts the sleeve substantially facewise against the support wall and prevents the sleeve from bending. The wall 52 is formed by five vertically-extending beams 62 which are separated from the plate 58 by a pair of top and bottom cross beams 63, 64. The flexible transparent sleeve 20 can be slid into the space 56, until it lies on a bottom wall formed by the bottom beam 64 and is prevented from buckling out of a substantially planar configuration by the narrow vertical walls. It would be possible to use additional horizontal beams between rows of slide-viewing regions indicted by lines 65, but applicant finds this is not necesssary. The resulting thin vertical walls leave twenty transparent slide-viewing regions 66A–66T which are transparent to the passage of light therethrough, arranged in five rows and four columns.

The carrier 32 has multiple runners 70, each with hook means 71 for engaging carrier holder 44. As shown in FIG. 5, the top and bottom portions of the carrier holder 44 form runner guides 72 which engage the runners 70 to guide them in movement parallel to a row of slide viewing regions on the carrier and therefore parallel to a row of slides on the sleeve 20. Each runner 70 (FIG. 4) has a pair of widely spaced runner portions such as 70a and 70b, that are spaced parallel to a row of slide storage positions of the sleeve 20 when the sleeve is installed on the carrier. These runner portions stably support the carrier in horizontal sliding movement along the runner guide.

In order to convert an ordinary prior art slide projector 10 of FIG. 1 into apparatus for viewing slides held in a transparent storage sleeve, an operator first removes the projection lens from the lens retainer 18 of the projector and installs the auxiliary lens 46 therein. The operator then attaches the clamp 36 to the projector housing, and installs the original projector lens 42 in a projection lens receiver 80. When the operator wishes to show the slides held in a storage sleeve 20 (FIG. 6) he removes the storage sleeve from a three-ring binder and inserts it into the space 56 (FIG. 5) of the carrier. The operator then slides the carrier onto the carrier holder 44, at one of the five vertical row positions of the carrier where the slides-to-be-viewed are located. With the light source of the slide projector turned on, the operator slides the carrier 32 horizontally until a desired slide of a row is at the projection location 48 (FIG. 1). A focusing knob 82 may be turned to shift the position of the projection lens 42 along the optical axis 84 to focus the image of a slide located at the projection position 48 onto a screen. The operator can slide the carrier 32 in the horizontal direction indicated by arrows 84 to project any one of the four slides in a row. Another row of four slides can be projected by sliding out the carrier and sliding it back into place at a different vertical position with respect to the carrier holder 44. The carrier holder assures that each slide will have a proper horizontal position and orientation when moved into the projection location. The operator can easily determine how far to slide the carrier so that the slide is centered in the field of view on the screen.

Although an adapter can be used to convert a prior art slide projector which holds slides in a stack, into apparatus for showing slides stored substantially coplanar, it is possible to construct an entire projector initially designed to show slides that have been stored in a coplanar arrangement. Such a projector machine requires the functional elements of the adapter 30, plus a light source, a concentrating lens holder, and a housing for holding the elements together so they can be supported on a table or the like.

Most modern slide projectors have a low "profile" so they have a limited height and project a light beam primarily horizontally through the projection location and from there to the screen. The Kodak Carousel 4600 projector has a height of about 4 inches, and even a tilt-adjusting leg extends the height of the front by a maximum of 3 inches. A common sleeve has a height of about 11 inches, so that when the topmost row of slides is being projected the bottom of the sleeve lies about 7 inches below the bottom of the projector. It would be possible to lay the sleeve in a horizontal plane and deflect light vertically through a slide and then deflect the light again horizontally to a screen. Applicant avoids the need for such deflections by placing the slide projector so its bottom 10B lies on a table top 41 (FIG. 1) near the forward edge 43 of the table. The carrier 32 and storage sleeve 20 therein lie slightly forward of the table edge so they can extend several inches below the top of the table. This results in a simple adapter mechanism. Also, the fact that the flexible storage sleeve is substantially vertical avoids large sagging of portions of the sleeve that might occur if it lay substantially horizontal and there were wide areas where the sleeve was unsupported. Even if the arrangement is provided for an initially manufactured slide projector, so the housing could be manufactured to have any height, the present arrangement is advantageous in permitting a compact (in height) projector housing to be used.

FIGS. 7, 8, and 8A illustrate a portion of another slide projection apparatus 210 which can be used to project slides that have been stored in the planner sleeve 20. The particular arrangement is in the form of an adapter for mounting on a prior slide projector, but the arrangement can be provided in an initially manufactured slide projector. The apparatus includes three major components, including a carrier 212 for holding the storage sleeve, a carrier holder 214 mounted on the housing 38 of a projector 10, and an intermediate support 216 which supports the carrier 212 on the carrier holder 214. The intermediate support 216 includes a pair of runners 218, 220 that engage the elongated bar member formed by the carrier holder 214, to allow the intermediate support to slide horizontally thereon. The intermediate support also has a pair of vertical guides 221, 222 forming largely vertically extending slots 223 which receive opposite sides 224, 226 of the carrier to allow the carrier to slide vertically, with the sleeve and the slides therein lying in the film plane.

The elongated bar member 214 is part of a holder assembly 34' that is largely similar to the holder assembly 34 of FIG. 1. The carrier 212 is of relatively simple construction, including slightly spaced rear and front walls 230, 231, each having three vertical strips 232, 233, 234 joined by upper and lower cross strips 235, 236. A pair of stops 237 are placed on the upper strips to limit downward movement of the carrier. The spaces between the strips form rows and columns of slide storage positions 66A–66T where slides are held by a sleeve installed in the carrier. The middle vertical strips 233 of the walls each includes a portion 238 lying between the uppermost and lowermost rows (which include positions 66A, 66Q) and between the furthest horizontally spaced columns (which include 66A and 66D) to resist buckling of the flexible sleeve when it lies in a vertical plane.

The intermediate support 216 includes a spring 242 lying inside one of the vertical guides 221 which presses against one side 224 of the carrier to supply sufficient friction to prevent the carrier from falling under its own weight and that of the sleeve and slides therein which total about one pound. However, the friction is low enough so the carrier can be pushed up and down with a moderate force such as five pounds, and certainly with a force less than fifty pounds. The spring includes an upper end 243 fixed to the vertical guide, and a lower end 244 hooked around the bottom of the vertical guide but able to move down slightly therein when the middle 246 of the bowed spring is flattened. An indexing device 248 is used to help stop the carrier at each of five vertical positions at which the slides thereon are aligned with the projection location 48'. The indexing device includes a threaded member 250 with a plunger 252 having a rounded nose that can enter any one of five recesses 254 formed at one side of the carrier. A coil spring 253 urges the plunger into the recesses. The friction created by the spring-biased plunger can be made sufficient to hold the carrier against falling, even in the absence of spring 242.

The projection apparatus 210 is installed in a prior art slide projector of the type shown in FIG. 1 by removing the projection and inserting a tube 262 containing an auxiliary lens in place of the original projection lens. The holder 214 is fixed to the tube 262, which assures that the intermediate support 216 and the carrier and sleeve thereon will be mounted at a predetermined location relative to the projector and its light source. The heads 264 of two of a group of screws 256 which mount the tube 262 on the intermediate support, serve as a stop which can abut a surface 268 on the intermediate support 216 to limit its horizontal sliding in one direction to prevent the intermediate support from being pulled entirely off the carrier holder 214. Applicant has built a functioning apparatus of the type illustrated in FIGS. 7 and 8, and found it to operate well. In particular, the carrier and the sleeve with slides therein stably held the vertical and horizontal positions to which it was moved, and with the movement accomplished with a relatively low force.

FIG. 9 illustrates a portion of another arrangement similar to that of FIG. 1, but wherein the carrier holder 44A has a pair of magnets 94 for holding the carrier at a position wherein the sleeve 20 and its slides always lie substantially in the projection plane 88. At least a portion of the carrier 32A, such as the plate 58A thereof is formed of ferromagnetic material so it is attracted by the magnets. Applicant has initially used a magnetic holder to hold a carrier, but found that it was difficult to properly position each slide at the projection location, not only because the slide had to be moved to the proper horizontal and vertical position, but because the carrier was easily tilted so that its top and bottom edges were not aligned with the horizontal. To avoid this, applicant uses a runner 96 which bears against a runner guide surface 98 formed along the upper edge of the carrier holder. The runner 96 can include a horizontally-extending strip extending along the entire width of the carrier, or can include two or more small runners spaced horizontally along the width of the carrier.

The operator places the carrier in approximate position, with the runner 96 above the runner guide 98, and then presses down on the top 100 of the carrier so that all portions of the runner 96 press against the runner surface 98. This assures that the slides will be at the proper height when slid horizontally to the projection location, and also assures that the carrier and slides will be oriented so the upper and lower surfaces of each slide are horizontal. The operator can move from one row of slides to the next lower row, by pushing up the carrier, while allowing the inclined upper surface 102 of the next lower runner to move across the front surface of the carrier holder and then above the runner surface 98. Then the next lower runner 96B can be pushed down to lie flat against the runner surface 98. Other arrangements can be used, where a magnet also holds the carrier to the carrier support, and a runner controls the vertical position of the carrier and its alignment. It is also possible to have the carrier oriented in a horizontal plane, so that it is moved in two horizontal directions to show slides in different rows and columns.

The sleeve 20 shown in FIG. 6 is a low cost and commonly available device that holds numerous slides in a coplanar relationhip. FIG. 10 illustrates another sleeve 110 which comprises a plate of material having rows and columns of holes 112 for receiving slides. The walls of each hole include a pair of stops 114, 116 for limiting the depth of insertion of the slide, and a pair of resilient holders 118, 120 that "snap" onto the front of a slide when it is fully inserted. This sleeve 110 can be somewhat more expensive to manufacture, but it holds the slides more precisely coplanar. The opposite faces of the slides are not covered, which has the disadvantage that the slide is not as well protected, but which has the advantage that the images on the slides can be projected without degradation by uneven plastic sheets against its opposite faces.

FIGS. 11–13 illustrate another carrier 130 somewhat similar to that of FIG. 4. However, the carrier 130 has a transparent rearward wall 132 and a forward wall 134 that forms horizontal beams 136 extending along the full width of the carrier and vertical beams 138 extending along the full height of the carrier. Also, the carrier has six runners 140 that each extend continuously along most of the width of the carrier. The carrier front wall 134 essentially comprises a solid shape with numerous openings at 142 through which the slides can be viewed. It is possible to use a transparent front sheet to avoid the need for forming the multiple holes 142.

FIG. 13A illustrates another carrier 143 which includes a single rigid support wall 144. The storage sleeve 20 is maintained facewise against the support wall in the mounted position of the sleeve, by three rubber bands 145–147. The ends 148 of each elastic, or rubber, band are anchored to the opposite sides of the carrier. In the mounted position the slide storage positions of the sleeve are aligned with slide-viewing regions 149 of the carrier. The bands lie between rows of such regions, to form means for supporting the sleeve against bending, at locations on the support wall between transparent slide-viewing regions 149, to maintain the slides substantially coplanar. Six runners 140A support the carrier at any of five vertical positions on a carrier holder of the type shown in FIG. 1.

FIGS. 14 and 15 illustrate another carrier 150 which holds a more rigid sleeve 110 of the type shown in FIG. 10. Instead of sliding the carrier 150 in a horizontal direction indicated by arrows 152, a person grasps an edge 154 of the sleeve and moves it within the carrier along a horizontal bottom wall 155. The carrier has a laterally-extending slot 156, which can receive the fingers of a person who slides his sleeve. When the sleeve proceeds from the left side of the carrier as in FIG. 14, a person can grasp the other side 158 of the sleeve to move it, to align a slide at a slide-projecting position indicated at 160. The carrier has transparent front and rear walls 162, 164, and has a rearwardly-extending support element 166 that can rest on a support surface 168 of a mount 170. The carrier has five support elements 166 in order to show slides in five different rows.

FIGS. 16–18 illustrate another embodiment of the invention, wherein the carrier 174 has largely vertical and horizontal grooves 176, 177 along its opposite faces which engage guide elements 178 on a pair of guides 180, 182. One guide 182 lies on a rearward carrier holder member 186 which could lie directly on the housing of the projector 188. The other guide 180 lies on a forward carrier holder member 190 which also serves as a lens holder which can hold a lens assembly 192. Each guide 180, 182 has widely separated guide elements 178 that fix the orientation of the carrier, so that when a slide-holding sleeve 194 is positioned in the carrier, each row 196 of slides remains horizontal.

A moderate level of friction is created between the add elements 178 and the walls of the grooves 176 in the carrier, by the fact that the two guides 180, 182 are biased towards one another. Such biasing is achieved by resilience of the carrier holder 186 and lens holder 190.

FIG. 19 illustrates another embodiment of the invention that is similar to that of FIGS. 16–18. However, in the system 200 of FIG. 19, the guide closest to the lens includes leaf springs 202, 204 that carry the guide elemens 178 that engage the grooves of the carrier. The rearward guide 206 is similar to the guide 182 of FIG. 17, except that it is formed as part of the carrier holder 186A.

Thus, the invention provides apparatus for enabling the projection onto a screen of the images of slides that are contained in a flexible transparent storage sleeve which can hold the slide substantially coplanar, without the need to remove and later return the slides from the sleeve. This is accomplished by the use of a carrier having a support wall and means for maintaining the sleeve substantially facewise against the support wall, and means for slidably supporting the carrier while maintaining its orientation, so that any of a group of slides in the same row can be shown in sequence, rapidly and with little operator effort.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for use with a projection arrangement which is designed to lie in a predetermined orientation and includes means defining a projection location lying in a film plane that is oriented so an imaginary line normal to it is primarily horizontal, and means for directing light from a light source, so the light moves in a predetermined forward direction along a primarily horizontal direction through a projection location and through a projection lens device which focuses an image of film at the projection location onto a screen, to enable the projection onto a screen of the images of slides contained in a storage sleeve, wherein the sleeve has a plurality of slide storage positions all lying substantially coplanar and arranged in a plurality of rows and a plurality of columns, comprising:

a carrier which has a support wall and means for maintaining the sleeve substantially facewise against the support wall at a predetermined loaded position of the sleeve, while allowing light to pass through said slide storage positions on the sleeve;

a carrier holder coupled to said projection arrangement; and means for supporting said carrier on said carrier holder with the slide storage positions of the sleeve lying in said film plane and with said carrier positionable at a plurality of vertical and horizontal positions in said film plane to bring any of a plurality of said slides to said projection location;

said projection arrangement including a housing with a bottom which is self supportable in said predetermined orientation on a horizontal surface, and the distance between the uppermost row of slides and the bottom of said carrier is greater than the height of said projection location above the bottom of said housing, and said carrier lies forward of said housing bottom, and when the uppermost of said rows lies in said projection location the bottom of said carrier lies below the bottom of said housing and said horizontal surface, whereby a housing of low height can be used.

2. The apparatus described in claim 1 including:

means defining a horiziontal surface with a forward edge, said horizontal surface lying above the ground, said housing lying on said surface near said forward edge, and said carrier lying forward of said edge.

3. The apparatus described in claim 1 wherein:

said supporting means includes a plurality of vertically spaced runners on said carrier, with portions of each runner spaced parallel to a row of slide storage positions, and said carrier holder includes a runner guide which is slidably engageable with any of said runners to guide the carrier so that successive slides lying along a row can be moved to said projection location, said carrier holder being readily disengageable from said runners and engageable with other runners to enable slides along different rows to be brought to said projection location.

4. The apparatus described in claim 1 wherein:

said carrier holder includes a track and a magnet, said carrier being magnetically attractable to said magnet, and said supporting means includes a plurality of vertically spaced runners on said carrier which can each engage said track but which can be pulled out of engagement at any horizontal position of the carrier along the track.

5. The apparatus described in claim 1 wherein:

said carrier has forward and rearward slightly spaced walls for closely receiving the sleeve between them;

said carrier holder includes rearward and forward members and also includes at least one leaf spring having a middle portion coupled to the forward member and a pair of ends which can substantially bear on the carrier to bias it towards said rearward carrier member.

6. The apparatus described in claim 1 wherein:

said supporting means includes an intermediate support which is slideable substantially horizontally on said carrier holder, said carrier being slideable largely vertically on said intermediate support;

said carrier having a pair of opposite sides, and said intermediate support having a pair of largely vertically extending slots which receive said opposite sides of said carrier, said intermediate support also including means for applying resistance against vertical movement of said carrier in an amount that prevents the carrier from falling from its own weight while permitting the carrier to be pushed up and down.

7. Apparatus for use with a projection arrangement which includes means for directing light from a light source onto a projection location on a film plane, and a projection lens device for focusing an image of film at the projection location onto a screen to enable the projection onto a screen of the images of slides contained in a storage sleeve, wherein the sleeve is transparent and has a plurality of slide storage positions all lying substantially coplanar and arranged in a plurality of rows and a plurality of columns, comprising:

a carrier holder coupled to said projection arrangement;

an intermediate support which is slideable substantially horizontally on said carrier holder and which forms a pair of vertical guides;

a carrier which can receive and hold said sleeve, while allowing light to pass through said slide storage positions on the sleeve, said carrier being slideable substantially vertically on said vertical guides of said intermediate support; and means for pressing said carrier against said intermediate support to provide friction that resists vertical sliding of the carrier under the downward force of its own weight while permitting such vertical sliding when the carrier is pushed vertically, the top of said carrier being accessible to be directly pushed up and down by hand.

8. The apparatus described in claim 7 wherein:

said means for pressing includes a spring which presses largely horizontally against said carrier.

9. The apparatus described in claim 7 wherein:

said carrier forms a plurality of vertically spaced recesses; and said pressing means includes a detent device on said intermediate support, which includes a member positioned to engage said recesses at predetermined vertical positions of said carrier to tend to retain said carrier at each of a plurality of vertical positions.

10. The apparatus described in claim 7 wherein:

said carrier holder includes an elongated substantially horizontal bar with upper and lower edges mounted on said projection arrangement, and said intermediate support includes upper and lower runners which slide horizontally along said bar edges.

11. Apparatus for use with a projection arrangement which includes means for directing light from a light source along a primarily horizontal direction through a projection location on a primarily vertical film plane, wherein the primarily vertical film plane is oriented so an imaginary line normal to the film plane extends primarily horizontal, and through a projection lens device onto a screen, to enable the projection onto the screen of the images of slides contained in a flexible storage sleeve, wherein the sleeve is transparent and has a plurality of slide storage positions all lying substantially coplanar and arranged in a plurality of rows and a plurality of columns, comprising:

a carrier which has a pair of closely spaced substantially rigid support walls forming a space between them into and out of which said sleeve can slide and which can closely receive the sleeve to prevent it from substantial bending, said walls constructed to allow light to pass through said slide storage positions on the sleeve, said walls engaging portions of said sleeve that lie between both adjacent rows and between adjacent columns of said storage positions;

a carrier holder coupled to said projection arrangement; and means for supporting said carrier on said carrier holder with the slide storage positions of the sleeve lying in said primarily vertical film plane and with said carrier moveable primarily vertically and horizontally in said film plane to bring any of a plurality of said slides to said projection location.

12. The apparatus described in claim 11 wherein: said sleeve includes at least three vertically spaced rows and at least three horizontally spaced columns of slide storage positions, and said support walls each includes a vertically-extending strip portion lying between the furthest horizontally spaced columns.

13. Apparatus for use with a projection arrangement which includes means for directing light from a light source onto a projection location on a primarily vertical film plane, and a projection lens device for focusing an image of film at the projection location onto a screen, to enable the projection onto a screen of the images of slides contained in a storage sleeve, wherein the sleeve has a plurality of transparent slide storage positions all lying substantially coplanar and arranged in a plurality of rows and a plurality of columns, comprising:

a carrier which has forward and rearward slightly spaced walls for closely receiving said storage sleeve between them at a predetermined fully-inserted position, said walls being transparent at positions corresponding to the locations of the slide storage positions of the sleeve;

a carrier holder, and means for holding said carrier on said carrier holder with the slide storage positions of the sleeve lying in said film plane and each row of slide storage positions extending substantially horizontal;

said carrier holder includes an upwardly-facing horizontally-extending support surface and a vertical guide surface, and said carrier has a plurality of support elements at different heights that can each engage said upper surface to prevent the carrier from falling and which can slide horizontally therealong, and also has means for holding the rear carrier wall against said vertically-extending guide surface to prevent it from tipping out of said primarily vertical film plane.

14. The apparatus described in claim 13 wherein: said means includes at least one magnet at said vertical guide surface, said rear wall of said carrier being magnetically attracted by said magnet.

15. The apparatus described in claim 13 wherein: said support elements each includes a hooked rearward end whose tip lies behind said support surface.

16. An adapter for use with a slide projector which includes a housing of low height, that has a bottom for stably resting on a support surface, means for holding a stack of slides and moving individual slides into a slide showing position, a light source, and means for holding optical elements that direct light forwardly along a substantially horizontal direction through said position and that project an image of a slide lying at said slide showing position onto a screen, wherein the adapter allows the projection of slides while they lie in a storage sleeve of greater height than said housing and which has slide storage positions lying coplanar in a plurality of rows and columns, comprising:

means defining optical elements which direct light onto a projection location forward of said housing;

a carrier holder;

means for mounting said means defining optical elements and said carrier holder to said slide projector housing at the front of said housing;

a carrier which has a support wall and means for holding said storage sleeve to said support wall, said carrier having a height greater than said housing;

means for supporting said carrier on said carrier holder, and allowing said carrier to be positioned so any of a plurality of slides of a row and in a column lying in said sleeve can be brought to said projection location, said supporting means constructed so it can hold the bottom of said sleeve below the bottom of said housing.

* * * * *